AUTOMOTIVE DOOR LOCK
Original Filed Dec. 30 , 1968 3 Sheets-Sheet 1
FIG. 1
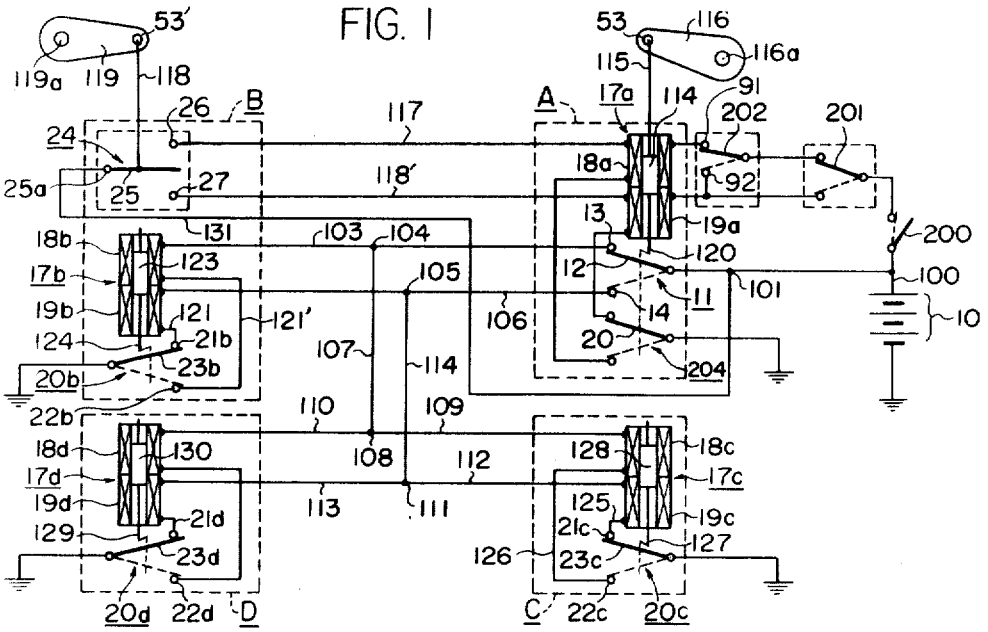
FIG. 3
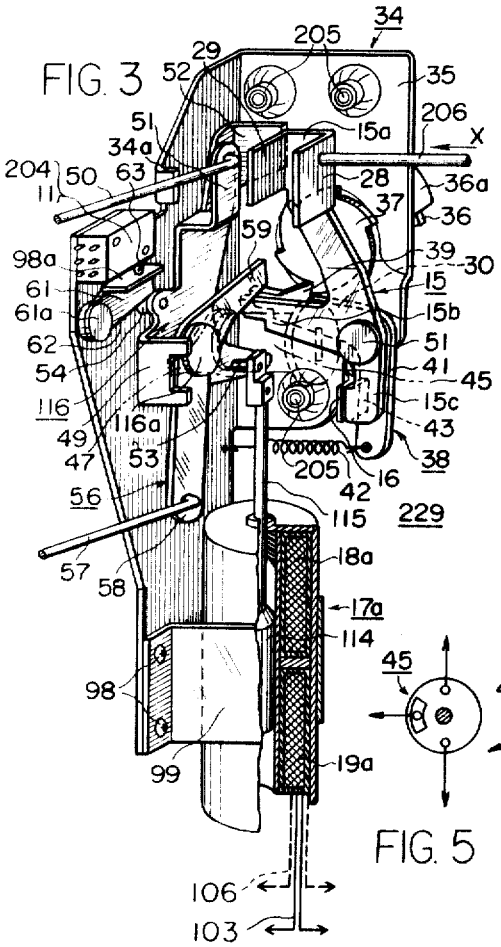
FIG. 5
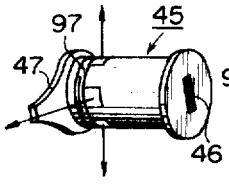
FIG. 4
FIG. 6
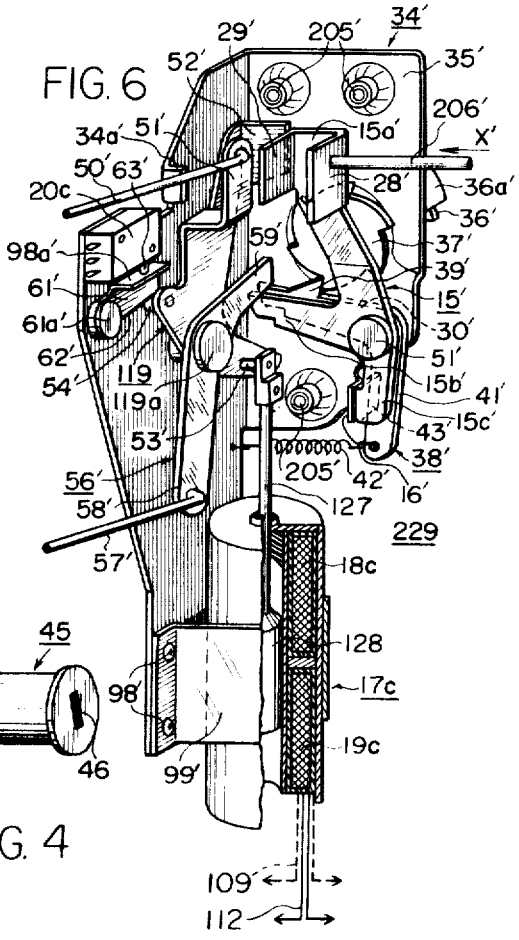

AUTOMOTIVE DOOR LOCK
Original Filed Dec. 30, 1968 3 Sheets-Sheet 2
FIG. 12
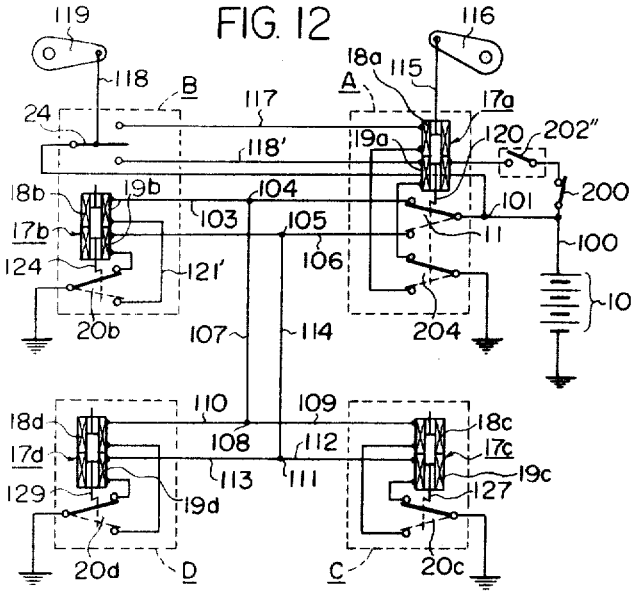
FIG. 13
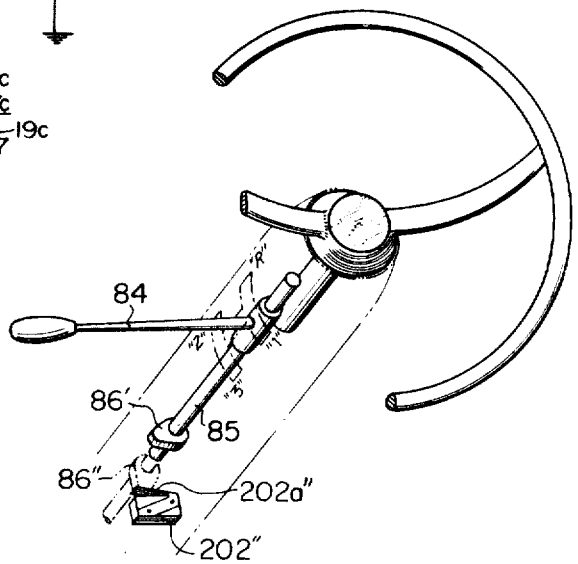
FIG. 15
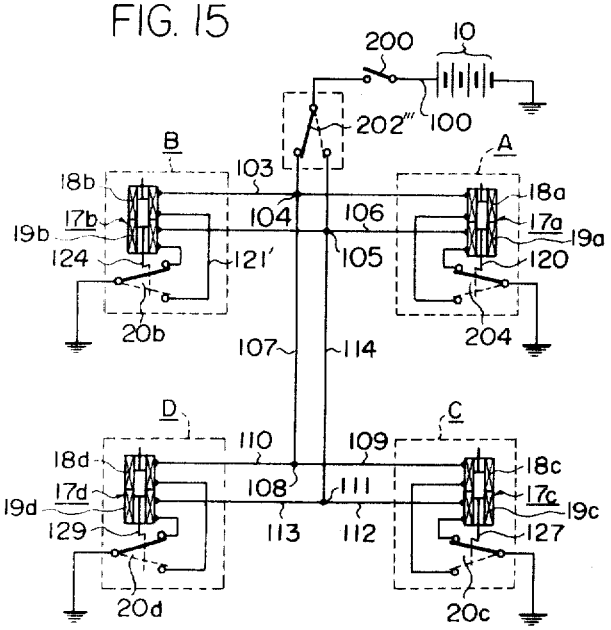
FIG. 14
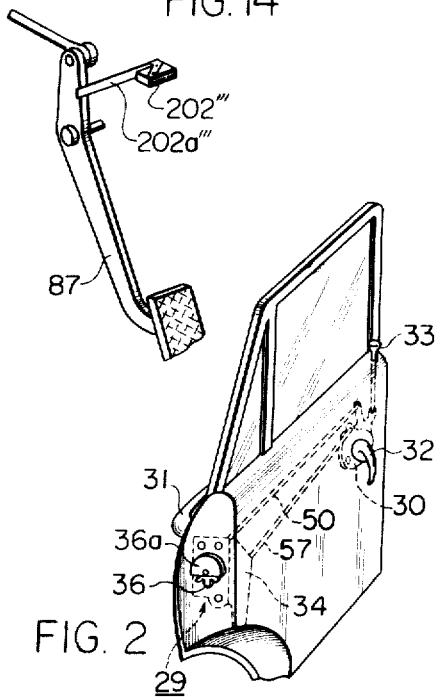
FIG. 2

AUTOMOTIVE DOOR LOCK

Original Filed Dec. 30, 1968 3 Sheets-Sheet 3

United States Patent Office

Re. 28,142
Reissued Sept. 3, 1974

28,142
AUTOMOTIVE DOOR LOCK

Kenichi Kazaoka, Kariya, Japan, assignor to Aisin Seiki Company Limited, Kariya-shi, Japan Original No. 3,593,816, dated July 20, 1971, Ser. No. 787,439, Dec. 30, 1968. Application for reissue July 20, 1973, Ser. No. 381,136
Int. Cl. E05b *65/36, 65/42*
U.S. Cl. 180—113 13 Claims

Matter enclosed in heavy brackets [ ] appears in the original patent but forms no part of this reissue specification; matter printed in italics indicates the additions made by reissue.

ABSTRACT OF THE DISCLOSURE

An automotive door lock arrangement comprising a door lock of latch type provided for each of all doors of an automotive vehicle, said arrangement being characterized by the provision of: a solenoid coil assembly comprising a locking coil means and an unlocking coil means provided for each of said doors, an automatic switch means connected with the driver's solenoid assembly for sensing starting of said vehicle, electric wiring means connecting all of said solenoid assemblies with each other, said door locks being actuated thereby into their locking position when the driver's locking coil means is energized for locking by receiving an electrical signal depending upon said energization.

This invention relates to improved electromagnetically operated door lock mechanisms.

Commonly used automotive door lock mechanisms have as their object to lock the conventional outside door handles for the purpose of being burglarproof, on the one hand, or to lock the inside door handles for the purpose of protecting the driver and passengers in the car from being projected out of the vehicle on an occasional and unintentional door opening while the car is running, on the other hand. In the latter case, the occasional and accidental door opening is made by an unintentional touch to the inside door handle by the passenger or by a malfunction of the mechanism. For the prevention of such accident, there is provided an inside lock button for each of the automotive doors which buttons are arranged to be operated by the driver.

As is commonly known, however, a careless driver is liable to forget his responsibility in the above sense. On the other hand, it is a troublesome job for the driver to watch and manipulate in each case the said safety buttons, because he is normally highly occupied by other important jobs imposed on him.

Even when the lock buttons have been actuated by the driver, a child passenger may innocently operate an inside door handle, upon release of the related door lock button, which may naturally invite a dangerous accident.

It is an object of the invention to provide an automotive door lock mechanism capable of being controlled centrally at the will of the driver.

A further object is to provide an automotive door lock mechanism which is brought into its operating position when the cars starts and when it is in its running condition and released from the operating position when the car is stopped.

These and further objects, features and advantages of the present invention will become more clear when reading the following detailed description with reference to the accompanying drawings which constitute part of the present specification. It should be however expressly understood that the embodiments shown therein and to be described hereinafter are given only for the illustrative purpose and various and different modifications thereof should occur to those skilled in the art when reading through the whole disclosure of the specification which fall within the scope of the appended claims.

In the drawings:

FIG. 1 is a schematic representation of the first embodiment of the invention, substantially illustrative of the electric circuit elements thereof.

FIG. 2 is a perspective view of an automotive vehicle door which is fitted with the door lock mechanism.

FIG. 3 is a partially broken-away perspective view of a driver's or assistant's door which is fitted with a part of the door lock mechanism according to this invention, when seen from inside of the cab.

FIG. 4 is a perspective view of a conventional door key cylinder assembly which is shown in FIG. 3 in phantom lines, yet being provided with additional electric contacts so as to be fitted to the assistant's door lock.

FIG. 5 is a schematic cross-sectional view of the door key cylinder assembly shown in FIG. 4.

FIG. 6 is a similar view to FIG. 3, showing a similar door lock mechanism shown therein, which is however adapted for attachment to a passenger's door.

FIG. 12 is a similar view to FIG. 1, showing a modified arrangement therefrom.

FIG. 13 is a perspective view of an automatic control switch operated by the gear change lever and adapted to control the circuit shown in FIG. 12.

FIG. 14 is a modification of the switch means from that shown in FIG. 13 which is cooperatively, connected with a conventional accelerator or clutch pedal.

FIG. 15 is a similar view to FIG. 1, showing a still further modified arrangement.

Figure 7:
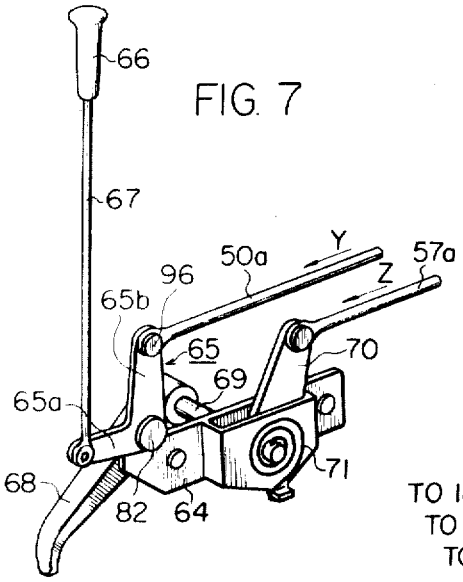
FIG. 7 is a perspective view of a remote control mechanism adapted for preforming selectively door locking and unlocking operations.

Referring now to the accompanying drawings, several preferred embodiments of the invention will be described in detail.

In FIG. 1, dotted line blocks A, B, C and D represent in a highly simplified form, four doors of an automotive vehicle, more specifically, those for driver, assistant, right-hand and left-hand passengers, respectively, when seen in the running direction of the vehicle. 10 denotes an automotive battery, one of the poles of which is grounded as shown, while the opposite or positive pole of the battery is electrically connected, on the one hand, to switch arm 12 of a main switch 11 through a junction 101, and selectively connected, on the other hand, through series-connected switches 200, 201 and 202 to solenoid coil elements 18a and 19a. The main switch 11 is adapted for locking the remaining doors B, C, and D when the driver's door A is closed, as will be described more in detail hereinafter. As shown, the main switch arm 12 is adapted for selective cooperation with either stationary contact 13 or 14. Stationary contact 13 is connected through junction 104 to solenoid coil element 18b by a lead 103. Stationary contact 14 is connected through a junction 105 by a lead 106 to a solenoid coil element 19b. Junction 104 is connected by a lead 107 to a further junction 108 which is connected through leads 109 and 110 to locking solenoid coil elements 18c and 18d for doors C and D, respectively. In the similar way, junction 105 is connected by a lead 114 to a junction 111 which is connected through leads 112 and 113 to locking solenoid coil elements 19c and 19d for passenger doors C and D, respectively. As shown, the lock control solenoid assembly, generally shown at 17a for the driver's door A comprises the pair of said coil elements 18a and 19a, having a common armature 114 which is linked by a connecting rod 115 to a door lock lever 116 which is pivoted at 116a on the door A, although remotely shown for clarity.

The other ends of companion solenoids 18a and 19a are connected, respectively, through leads 117 and 118' to stationary contacts 26 and 27 of a control switch, generally shown at 24, having a switch arm 25 connected through a lead 131 to said junction 101, as shown. This arm 25 is mechanically linked by a connecting rod 118 to the door lock lever 119 for the second door B. The lever is pivoted at 119a on the door B. In the drawing, connecting rods 115 and 118 are shown in a simplified form only by respective single lines. Armature 114 is mechanically linked through a connecting rod 120 to the switch arm 12, as well as switch arm 20 of a further switch 204, thus the both constituting a gang switch.

The opposite ends of companion solenoids 18b and 19b of solenoid assembly 17b for the second door B are connected through respective leads 121 and 121' to stationary contacts 21b and 22b of a switch, generally shown at 20b, having a switch arm 23b which is grounded as shown. Solenoids 18b and 19b have a common armature 123 which is mechanically linked through a connecting rod 124 to the switch arm 23b.

In the similar way, companion solenoids 18c and 19c of solenoid assembly 17c for the third door C are connected at their opposite ends through respective leads 125 and 126 to stationary contacts 21c and 22c which are arranged to cooperate with the switch arm 23c of the switch unit 20c for the third door C. The arm 23c is grounded as shown and mechanically linked through a connecting link 127 with the common armature 128 for the solenoids 18c and 19c.

The third switch unit, generally shown at 20d, for the fourth door D, comprises a switch arm 23d which is grounded as shown, on the one hand, and mechanically linked through a connecting link 129 with a common armature 130 to companion solenoids 18d and 19d. Switch arm 23d cooperates with either of stationary contacts 21d and 22d which are electrically connected as before with the opposite or remaining ends of the companion solenoids 18d and 19d consisting the solenoid assembly generally shown at 17d.

The switch unit 24 is so arranged that it is manually controllable from outside of the vehicle, as will be described hereinafter. When this switch unit is not otherwise manipulated the switch arm 25 is kept in its neutral position as shown, thus being separated from contact with the stationary contacts 26 and 27.

Switch 200 is formed in practice into a conventional ignition key switch, while switch 201 is formed into a manual door lock switch mounted on the conventional instrument panel not shown, of the vehicle.

Switch 202 consists of an automatic transfer switch which is arranged to be actuated to transfer when the vehicle starts to run, as will be described later herein.

Switch 24 is a door lock key switch which is arranged to be operated from outside of the vehicle as conventionally and to be more fully described hereinafter. The arm 25 of switch 24 is pivotably connected through connecting link 118 to the door lock lever 119 hinged at 119a on the door 13 which lever is shown separately only for simplicity.

Upper coil element 18a, 18b, 18c and 18d serve as door lock release coils, while lower coil elements 19a, 19b, 19c and 19d serve as door lock coils, as to be more fully described.

In FIG. 2, an automotive door such as at D referred to in FIG. 1 is shown as being fitted with an allotted door lock mechanism, generally shown at 229. Numeral 30 represents a remote control assembly comprising two separate and overlapped link mechanism elements one of which is mechanically connected with an inside door handle 30, on the one hand, and connected through a connecting rod 57 to said mechanism 29, on the other. The remaining link mechanism element is mechanically connected with an inside lock button 33, on the one hand, and connected through a connecting rod 50 to said mechanism, on the other. As will be later described in detail, either said handle 30 or said button 33 can be operated manually for selective locking and unlocking the door lock mechanism from inside of the vehicle.

Next, referring mainly to FIG. 3, the details of the door lock mechanism will be described. This mechanism is generally fitted to the driver's body A, while that shown in FIG. 6 is adapted for being fitted to either of passenger's door C or D. The door A, not shown in FIG. 2 for simplicity, houses therein a door lock base 34 by means of a plurality of, herein shown three, screw means 205, said base having generally an angular configuration. The inside surface of the door lock base is seen at 35. On the outside surface of the base which is naturally the opposite side to said surface 35, there is rotatably mounted a pinion 36, only partially shown, which is partially covered by a safety cover 36a and kept in meshing relation with a conventional striker, when the door is closed. The shaft, not shown, of said pinion 36 is fixedly connected with a ratchet wheeel 37 which cooperates with a pawl member 38 pivotably mounted on the inside surface 35 of said base. As conventionally, this pawl member 38 allows the pinion 36 to rotate in either direction in the case of door opening or closing operation, while it checks the pinion from being rotated in the case of the door closed. For this purpose, the pawl member 38 comprises a tooth projection 39 on its arm 30 and a stem 41 made integral therewith and pivotable at 51 on the base 34. There is provided an urging spring 42 attached to the lowermost end of the stem 41 at its one end and to the base 35 at its another end, thus exerting normally a clockwise turning effort onto the pawl member 38 in FIG. 3 and the latter being thereby resiliently urged to turn in its ratchet engaging direction. Pushbutton lever 15 is pivotably mounted at 51 commonly with said pawl member 38, said lever being in the form of a triple-arm lever as shown. The upper arm 15a is formed into a fork comprising two projections 28 and 29. The first projection 28 is a motion receiving member which is actuated when a door opening manual effort is applied by means of the outer door handle such as at 31 in FIG. 2. The second projection 29 is designed and arranged to act as a movable stop for preventing unintentional door opening operation upon engagement of the door latch. Middle arm 15b of the lever 15 extends substantially in the horizontal direction and acts to transmit its motion to said pawl member. The remaining and depending arm 15c is formed with a lateral projection 43 which is adapted to cooperate with a stationary stop 16 extending from the door lock base 34.

Although not shown the mounting means, there is provided a conventional manual key cylinder 45 which is shown in phantom lines in FIG. 3, yet shown in its physical shape in FIGS. 4 and 5. The key cylinder is formed with a bore 46 for the reception of a conventional manual key, not shown, for performing a manual door opening or closing operation from outside the cab, as the case may be. A conventional key lever 47 is pivotably mounted at the rear end of said cylinder so as to be rotated in the latching or latch-releasing direction depending upon the occasional rotational movement of said key in either direction.

Lock control lever 116 is formed with a motion receiving part 49 which is formed into a fork so as to operate mechanically with said key-operated lever 47, and comprises a connecting part at 51 which is connected with a motion transmitting elongated rod 50. This rod 50 is also shown in FIG. 2 as being linkedly connected to lock pushbutton 33. The lever 116 is still further formed with a motion-checking part 52 which is adapted for cooperation with said first projection 28 on the lever 15 so as to prevent it from turning in the lock-releasing direction upon the engagement of the door latch. A projecting pin 53 is also secured to an additional arm of lever 116 and is connected with said connecting rod 115 of the solenoid armature 114.

An actuating pin 54 is fixedly mounted on the lever 116 so as to control the gang switch assembly which is mounted on the door lock base. The solenoid assembly 17a is rigidly attached to the same base by means of a metallic tie band 99 and a plurality of set screws 98 as shown.

Inside open lever 56 is also pivotably mounted at 116a on the door lock base in an overlapped manner relative to said lever 116, said former lever comprising an upper arm 59 and a lower arm 58. is pivotably connected with one end of a connecting rod 57 which is linked in turn at its opposite end to the inside door open handle 32 shown in FIG. 2. The upper arm 59 is an actuator adapted to transmit a latch-releasing motion in said ratchet pawl 38.

In practice, the pin 54 controls the gang switch assembly 11 and 204 through the intermediary of a small control lever 61 pivotably mounted on the door lock base.

This control lever 61 has a motion-receiving surface 62 kept in slidable contact with said pin 54, and an actuating cam surface 98a kept again in slidable contact with the on-off control pushbutton 63 of the gang switch. The general configurations of these surfaces 62 and 98a are so selected that when the lever 116 is turned counterclockwise direction in FIG. 3, the pushbutton 63 is pushed out resiliently from the pushed-in position shown. With the switch pushbutton is kept in its pushed-in position, the switch arm 12 is in its full line position in FIG. 1. On the other hand, when the switch button 63 is brought into its pushed-out position under the influence a spring contained within the main switch and not shown only for simplicity, the switch arm 12 is transferred to its dotted lined position in FIG. 1 for contact with another stationary contact 14. Gang switch element 204 will act with its switch arm 20 in the similar manner in this case.

The key cylinder assembly shown in FIGS. 4 and 5 is somewhat modified so as to attach it to the door lock mechanism for the assistant door B. In the foregoing the cylinder block has been described as fitted to the driver's door A for quicker and easier understanding of the invention. In this modification, the key cylinder 45 carries the contacts of switch 24. Cylinder 45 is provided with a key-operated rotor 97 made integral with said lever 47 which construction is applicable to the key cylinder adapted for use with the door lock mechanism for the door A. In this case, however, the rotor 97 carries switch arm 25, while the stationary cylinder 45 carries contacts 26, 27 and 25a of the transfer switch 24, as above briefly referred to, said switch being so arranged that when the related door lock mechanism is brought into its locking or lock-releasing position, as the case may be, all other door lock mechanisms for the doors A, C and D are correspondingly operated by way of the central control system. There is no main switch 11 in the assistant's door lock mechanism and in place of the main switch, the door latch for the door B is fitted with a transfer switch **20*b* which is similar to those at 20c (FIG. 6) and 20d for the door latches of the doors C and D. These switches 20b, 20c and 20d** are arranged so as to interrupt the respective current circuit upon energization of the respective solenoids as will be more fully described hereinafter.

The remaining parts of the door latch assembly shown in FIG. 6 are similar to those employed in the mechanism shown in FIG. 3 and therefore, if not otherwise specified, denoted with respective same numerals, yet attached with a single prime.

It would be clear from the foregoing that in the mechanism shown in FIG. 6, the key cylinder assembly such as at 45 has been dispensed with, and that the arm of 23c or 23d of transfer switch 20c or 20d is shifted from its full line position to its dotted line position or vice versa, depending upon the energization of the respective solenoid assembly 17c or 17d.

In FIG. 7, a remote control assembly for control of the locking and releasing operation of the door lock mechanism from the interior of the cab is schematically shown in perspective. This assembly is substantially arranged within the interior space of a vehicle door as in the case of FIG. 2 and may be substituted for substantial part of the door lock manipulating mechanism shown therein, so far as the inside control operations are concerned.

A base member 64 is fixedly attached to the vehicle door, although the fixing means have been omitted from the drawing for simplicity, and a bellcrank lever 65 is pivotably mounted at 82 on the base member. One arm 65a of the bellcrank lever 65 is linked through a connecting rod 67 to an inside lock button 66 which is similar to that shown at 33 in FIG. 2, while the other arm 65b is linked at 96 with a connecting rod 50a similar to that shown at 50 in FIGS. 2 and 3, the opposite end of the rod 50a being naturally connected linkedly to door lock control lever 116 of the like. The numeral 68 denotes an inside door handle such as at 32 in FIG. 2 which handle is fixedly attached to the rear or inner end of a shaft 69 which is rotatably mounted in said base member 64 and projects a small distance therefrom for the attachement of said handle. A lever 70 is also fixedly attached at its one end to the same rotatable shaft 69 and linked at its free end with a connecting rod 57a similar to that shown at 57 in the foregoing. The opposite end of the rod 57a is linked to an inside open lever such as at 56 shown in FIG. 3. There is provided a spiral spring 71 one end of which is fixedly attached to the base member 64, while the opposite end of the spring is attached to another end of said shaft 69 which protrudes from the remote side of the base member from said inside door handle 68, for the purpose of automatic return movement.

Figure 8:
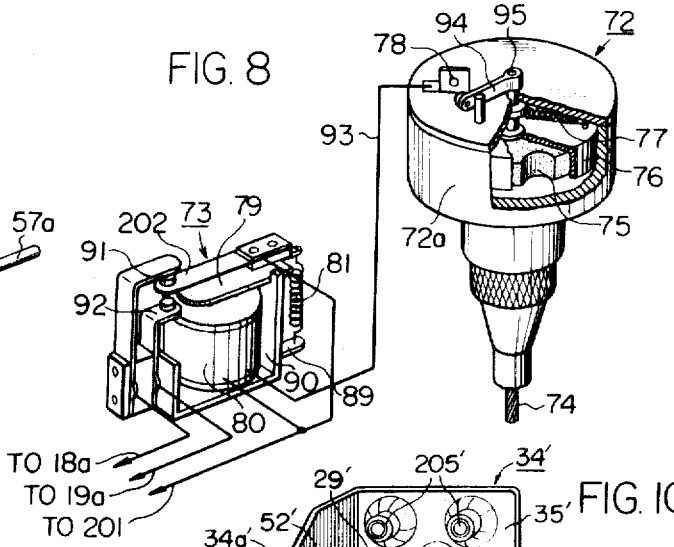
FIG. 8 is a perspective view, yet partially broken away, of an automatic switching means adapted for sensing the running and stopped conditions of the car for on-off control of the solenoids employed.

The device shown in FIG. 8 is designed and arranged so that an automatic switch means generally shown at 201 in FIG. 1 is provided for sensing and identifying the running or stopped condition of the automotive vehicle and adapted for controlling all the door lock mechanisms as will be more fully described. This device comprises substantially a sensing section 72 and a control relay section 73. The former section 72 comprises in turn a rotatable flexible shaft 74 which is arranged in the same way as the conventional speed meter flexible shaft so that it is rotated when the vehicle runs. At the uppermost end of said flexible shaft 74, a permanent magnet 75 is fixedly attached. An iron disc 76 is rotatably mounted within the interior of the hollow cylindrical housing of the section 72 and at a small distance from said magnet 75. Therefore, when the flexible shaft together with the magnet is brought into rotation, the iron disc will be naturally rotated by the magnetic induction which is selected to a relatively weak degree. There is also provided a return spring 77 formed into a coil spring as an example as shown for returning the iron disc to its starting or regular position when rotation of the flexible shaft 74 is stopped. The numeral 78 represents switch means which is actuated to establish a conducting passage 93 leading from the switch means to relay coil 80 when the disc 76 is rotated to a certain peripheral angle from its regular position under the magnetic influence of said magnet 75 by the rotational movement thereof in the aforementioned sense. For this purpose, a short stud 95 is fixedly mounted at the center of the upper surface of said iron disc which stud is attached in turn fixedly with an actuating lateral strip or arm 94, the latter being so designed and arranged to on-off control the switch means 78 formed preferably into a microswitch as shown.

The relay section 73 carries stationary contacts 91 and 92 and switch arm 202 shown in FIG. 1. Said relay section is further provided with a conventional movable armature 79 adapted for actuating said switch arm 202, and with a return spring 81 which is tensioned between a stationary stop 89 fixedly mounted on the yoke at 90 of said relay assembly, on the one hand, and one end of said armature 79, on the other, for returning thereby the actuated armature to its regular position upon deenergization of relay coil 80.

Figure 9:
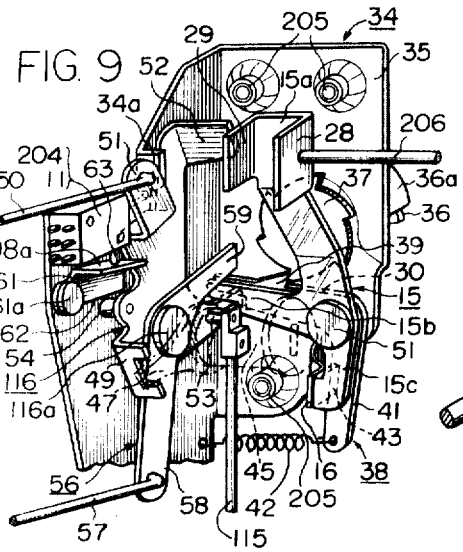
FIGS. 9 and 10 are partial detailed views of FIGS. 3 and 6, respectively, wherein the door lock has been brought into its locking position.
Figure 10:
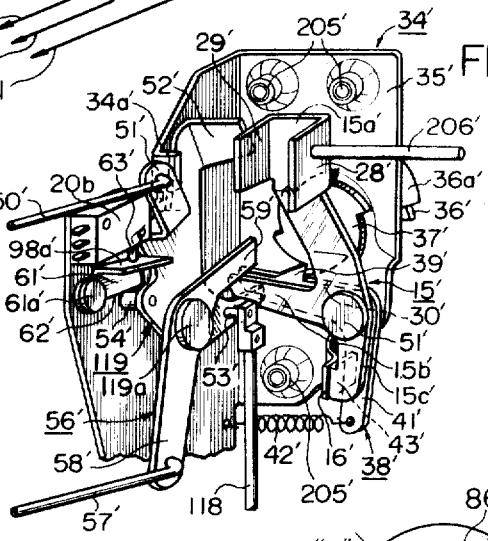

FIGS. 9 and 10 are perspective views of the locked conditions of the door lock mechanism according to this invention, the detail description of which will be set forth hereinafter where the operational functions of the mechanism is to be explained.

Figure 11C:
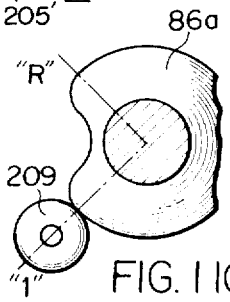
FIG. 11C is a schematic representation of one of the switch-actuating cams fixedly mounted on the shift lever shaft.
Figure 11B:
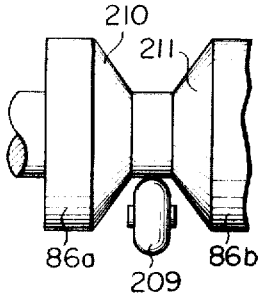
FIG. 11B is a side view of a part of the shift lever shaft together with a follower roller attached to said microswitch.
Figure 11:
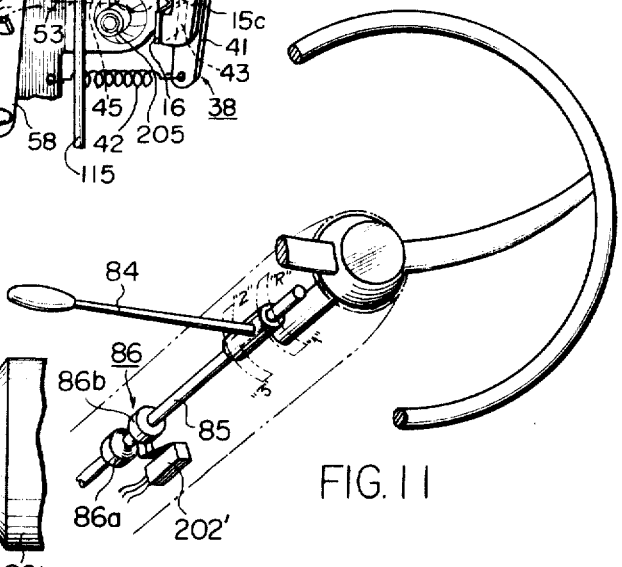
FIG. 11 is a perspective view of a switch means which has been modified so as to be controlled by a conventional gear change lever on the car.

In the embodiment shown in FIG. 11, the automatic switch 202' shown in FIG. 1 is arranged so as to cooperate with the conventional manual shift lever at 84 which is rigidly connected with its shaft 85 and may be positioned in each of four different speed control positions denoted "1," "2," "3" and "R" meaning the first, the second and the third speed change gear stage and the rear running stage, respectively. The shaft 85 is provided with a cam 86 adapted for the transfer control of switch 202' by manipulating the shift lever 84.

In FIG. 13, a similar embodiment to that shown in FIG. 11 is illustrated. In this case, the main difference consists in the employment of a different configuration of the switch operating cam 86'.

In a still further modified arrangement shown in FIG. 14, the switch 202''' is arranged to be controlled by a conventional accelerator pedal (or clutch pedal) 87 so that whenever the pedal is depressed, the switch 202''' is closed.

A modified circuit arrangement from that shown in FIG. 1 is shown in FIG. 12. The main difference of this modification consists substantially in that the switch 201 shown in FIG. 1 has been dispensed with and that the wiring connection of the automatic control switch 202'' relative to the solenoid assembly 17a has been considerably simplified.

In a still further modified circuit arrangement shown in FIG. 15, the wiring connection of the automatic control switch 202''' has been modified relative to other parts of the circuit as shown. Further, a part of the circuit which serves for locking and lock-releasing operations to be carried out from outside of the vehicle has been dispensed with.

Next, the operation of the door lock mechanism according to this invention will be described.

When a driver or the like authorized person wishes to latch the door lock mechanism for the driver's door A manually from outside of the vehicle, he must insert a conventional manual key, not shown, into the bore 46 of key cylinder 45 and turn it in counterclockwise direction in FIG. 4 so as to turn the key lever 47 together with rotor 97 in the same direction. Motion is therefore transmitted from the key lever to motion-receiving fork 49, thus lock control level 116 being swiveled from the position shown in FIG. 3 in counterclockwise direction about its pivot pin 116a and brought into the position shown in FIG. 9. More specifically, the relative conditions of the constituent parts shown in FIG. 3 are such that the push button lever 15 occupies such a position as to allow a release of the engagement of pawl member 41 from ratchet wheel 37 when latch-releasing motion is transmitted from outside door handle such as at 31 (FIG. 3) through an elongated connecting link 206 to the lever 15 at its top end and in the direction of an arrow X. Although the link 206 is shown only partially in FIG. 3, the link 206 is pivotably connected at its both ends with said handle 31 and said lever 16, respectively. On the other hand, the relative position of the mechanism components shown in FIG. 9 is such that the top end of the lever 116 has been moved towards the viewer so that the lever 15 is positively prevented from its rotation in counterclockwise direction by interference with the top end of the lever 116 in contrast to the position shown in FIG. 3 where the projection 29 formed on the lever 15 is free from any contact with the top end of the lever 116 so that said lever 15 is kept in its freely rotatable position in the counterclockwise or lock-releasing direction, when any uring force in this sense be applied against the action of return spring 42. In the former position shown in FIG. 9, therefore, the engagement of pawl member 41 with ratchet wheel 37 cannot be released even when a latch-releasing effort should be applied.

When it is desired to lock the door lock mechanism from the inside, the lock button 66, FIG. 7, is depressed for rotating the bellcrank lever 65 in counterclockwise direction about its pivot shaft 82, whereby the rod 50a is pulled in the direction as shown by arrow Y. Since the rod 50a is mechanically connected, although not shown, with the top end of lever 116 as in the similar manner to that shown at 50 in FIG. 3, the lever is brought into its locking position shown in FIG. 9. In this case, also, any release of the engagement of the pawl member 38 with the ratchet wheel 37 is positively prevented, even when the inside door handle 68 should be operated in the lock-releasing direction for drawing the connecting rod 57a in the direction shown by arrow Z in FIG. 7, in direct advance of an intended door opening operation. Although not shown, the rod 57a is connected at its other end with the lowermost end of lever 56 in the similar manner with that at 57.

When the door lock mechanism has been locked from outside or inside of the cab, it is naturally prevented from any unauthorized door opening, as will be understood from the foregoing. In addition, an unintentional door opening by the manipulation of the inside door handle is positively prevented. When the pushbutton lever 15 is checked from possible rotation in the aforementioned sense as shown in FIG. 9, any intended or nonintended clockwise or latch-releasing rotation of inside open lever 56 by manual actuation thereof in the aforementioned manner from inside of the cab is positively prevented by the abutting condition of the lever against the middle arm 15b of lever 15. Therefore, under this locked condition, a door opening operation from inside of the cab cannot be realized.

When it is desired to release the locked mechanism from outside of the cab, the manual key is introduced as before into the key insertion bore of the key cylinder represented in FIG. 9 in phantom lines, and turned in clockwise direction in the same figure, whereby the key level 47 is rotated in the same rotational direction. Thus, the lock control lever 116 is shifted from its locking position to lock-release position shown in FIG. 3 and the checked condition of pushbutton lever 15 is positively released.

When it is desired to release the locked condition of said mechanism from inside of the cab, the lock button 66, FIG. 7, is pulled manually in the upward direction, so as to rotate bellcrank lever 65 in clockwise direction about its pivot pin 82, whereby the road 50a is pushed forward in the opposite direction to that shown by arrow Y. In this way, lock control lever 116 will be rotated in clockwise direction about its pivot pin 116a. Therefore, the position of lever 116 is returned from that shown in FIG. 9 to that shown in FIG. 3, whereby pushbutton level 15 is released from its checked position into its free position.

As for the operation of passenger's door lock mechanism, it is substantially same as that for the driver's door lock except that the locking and unlocking operations have been dispensed with. Therefore, no further analysis thereof would be necessary for better understanding of the invention.

In the following, the electric control function of the door lock mechanism according to this invention will be described in detail.

The mechanism is capable of performing a centralized corresponding control of the assistant's door B and passenger's doors C and D by performing a locking or unlocking operation of the lock mechanism for the driver's door A.

When the door lock mechanism shown in FIG. 3 has been converted into its locked position as in the foregoing way described under consultation with FIGS. 3 and 9, the switch arm 12 of main switch 11 is transferred from contact with 14 into contact with 13. On the contrary, when the locked position of the mechanism as shown in FIG. 9 has been converted back into the unlocked position shown in FIG. 3, the switch arm 12 will be returned from its full line position to its dotted line one shown in FIG. 1. In this way, the desired centralized door control may be realized. Now assuming that the door lock shown in FIG. 3 has been locked from either inside or outside of the cab, lock control lever 116 is rotated in counterclockwise direction in FIG. 3 and the pin 54 mounted thereon acts through switch control lever 61 upon switch button 63 of the switch 11, thus the button being pushed out from inside and the relative position being changed into that shown in FIG. 9. Therefore, a circuit comprising: 10 → 100 → 101 → 12 → 14 → 106 → 105 → 19b → 121 → 21b → 23b → earth → 10 will be established. In the same way, a branch circuit including: 105 → 114 → 111 → 112 → 19c → 125 → 21c → 23c → earth to battery 10 will be established. Similarly, a further branch circuit including: 111 → 113 → 19d → 21d → 23d → earth to battery 10 will also be established.

In this way, current flows through the lower or door-locking coil elements 19c and 19d of the solenoid assemblies 17c and 17d for the passenger's doors C and D, respectively. By energization of these locking coil elements, plungers 128 and 130 are shifted upwards, motion being thereby transmitted from the plungers through respective connecting rods 127 (FIG. 6) 129 so as to rotate respective lock control levers 119 from its unlocking position to its locking position shown in FIG. 10. At the same time, respective switch arms 23c and 23d are each transferred from the full line position back to the dotted line position in FIG. 1, whereby otherwise possible continued current passage through locking coil elements during the locking operation of the door locks is effectively prevented. During the electric locking operation, each of the lock control levers 119 is rotated in the counterclockwise direction and therefore each of switch buttons 63' is released from the pressure and depressing effort exerted by the actuating pin 54', thus each of the switch arms 23c and 23d is transferred from contact with stationary contact 21c or 21d to the engaging position with another stationary contact 22c or 22d. Therefore, the conducting period of the locking circuit including leads 106, 114, 112 and 113 is almost instantaneous and defined substantially by the rising or locking movement of the plungers 128 and 130. Long extended current passage through locking coil elements 19c and 19d can thus be avoided in a reliable way.

If a passenger should raise any one of the door lock pushbuttons such as at 33 or 66 by unintentional manual touch after the vehicle driver has performed the centralized door locking operation and all the plungers are positioned at their upper position in FIGS. 1 and 3, pushbutton 63' of switch 20 will be pushed in and thus switch arm 23c is transferred from its dotted line position to its full line position in FIG. 1. Current will flow from battery 10 through 100, 101, 12 (dotted line), 106, 105, 114, 111, 19c, 125, 21c, 23c (full line) and earth and back to 10. By the energization of locking coil element 19c and upon upward movement of plunger 128, switch arm 23c will be transferred from its full line position to its dotted line position. In this way, lock control lever 119 (FIG. 6) will be returned instantly back to its locking position.

Therefore, when the driver has locked the door lock mechanism for his own door A, any one of all the remaining door locks will be brought back into its locked position even if a passenger should unintentionally draw up manually the related locking pushbutton 66 or the like.

Under circumstances, there may arise such a demand that any one of the locked door locks should be opened in an emergency. This demand may easily be satisfied by drawing the lock button 66 or the like upwardly and at the same time the related inside door handle such as at 68, FIG. 7, is operated so as turn in the door-opening direction.

For initiating an overall unlocking operation of all door locks, an authorized person may insert a door key into the insertion opening of the key cylinder provided either for the driver's or the assistant's door lock, and then turn it in the unlocking direction. Motion is therefore transmitted through key lever 47 to lock control lever 116 so as to turn in the clockwise direction in FIG. 9 about its pivot 116a, and switch button 63 is subjected through control lever 61 turning now in counterclockwise direction to pressure, thus switch arms 12 and 20 of the combined gang switch 11, 204 are transferred from their respective dotted line position to their full line position in FIG. 1. Current will now flow from battery 10 through 100, 101, 12 (full line), 13, 104, 107, 108, 109, 18c, 126, 22c, 23c (dotted line) and earth and back to 10. By the energization of the unlocking coil element 18c, plunger 128 descends electromagnetically so that switch arm 23c is transferred from its dotted line position to its full line position, upon performing the change over operation of lock control lever 119 from its locked position shown in FIG. 10 to its unlocked position shown in FIG. 6. Therefore, a continued current flow through unlocking coil element 18c may be positively prevented.

A unified or overall locking operation from the side of assistant's door through key operation as before may be easily understood from the foregoing without further detailed analysis of operation.

When it is intended to start the vehicle, the driver operates as usual the ignition key switch 200 to its "on" position as represented in FIG. 1 in dotted line. At the same time, or in advance thereof, the driver operates the selector switch 201 so as to occupy its full line position, thus the automatic switch 202 being connected with the positive side of battery 10.

When the driver operates the usual conventional vehicle drive appliances, not shown, so as to start the vehicle, the automatic switch 202 is automatically transferred from its full line position to its dotted line position, as easily understood from the foregoing disclosure set forth in connection with FIG. 8. Thus, an electric circuit starting from battery 10 through 100, 200, 201, 202, 92, 19a, 20 and earth back to 10 is established, thereby the lock coil element 19a of solenoid assembly 17a being energized. The plunger 114 is moved electromagnetically from its lower position (FIG. 3) to its upper position (FIG. 1) if the driver's door has been held in its unlocked position. Motion is therefore transmitted in this case from the plunger through rod 115 and pin 53 to lock control lever 116 which is thus rotated about its pivot pin 116a in counterclockwise direction from the position shown in FIG. 3 to that illustrated in FIG. 9. In this new position, the upper part 52 of said control lever 116 is kept in this locking position by abutting against a stationary stop 34a formed on the base 34. In this position, FIG. 9, common pushbutton 63 of the combined switches 11 and 204 is pushed out from inside and switch arms 12 and 20 (FIG. 1) of this gang switch assembly are transferred from their respective full-lined unlock position to dotted-lined lock position. In this respect, it should be noted that in FIG. 1 switch arms 12 and 20 are moved downwards and in counterclockwise direction by the upward movement of plunger 114, although the reverse movement of said switch arms could be imagined by the viewer at the glance of FIG. 1. This graphical representation has been made only by reason of limited space requirement of the drawing and for simplicity thereof. Current flows therefore from battery 10 through 100, 101, 12 (dotted line), 14, 106, 105, 19b, 121, 21b, 23b and earth back to the battery. By this current passage, locking coil element 19b for assistant's door B is energized and plunger 123 will move from its lower unlock position to its upper lock position.

Current will flow similarly from 105 through 114, 111, 112, 19c, 125, 21c, 23c and earth back to the battery 10. By this current passage, locking coil element 19c for passenger's door C is energized and plunger 128 will move from its lower unlock position shown in FIG. 6 to its upper lock position shown in FIG. 10.

Current will further flow from 111, 113, 19d, 21d, 23d, and earth and back to the battery 10. By this current passage, locking coil element 19d for passenger's door D is energized and plunger 130 will move similarly from its lower unlock position to its upper lock position.

By the upward movement of reespective plungers 123, 128 and 130, the respective door lock mechanisms for doors B, C and D are brought into their locking position in the similar way referred to above in connection with the driver's door A.

Upon operating the respective door locks for doors A, B, C and D in the aforementioned way, respective switch arms 23b, 23c and 23d are transferred from their full line position to their dotted line position. In this case, attention should be paid to the fact that the moving direction respective plungers 123, 128 and 130 is opposite to that of movement of the related switch arms 23b, 23c and 23d for the convenience of the drawing, as was referred to hereinabove with reference to the plunger 114 and switch arms 12 and 20 for the driver's door A.

If a passenger should elevate by a certain accident the nearby inside locking button which is not shown, but designed and arranged in the similar way as that shown at 33 or 66 and has been pushed down automatically by the aforementioned electromechanical locking operation of all the door locks, the locked position will be recovered soon as was referred to.

When the vehicle is stopped, the flexible shaft 74, FIG. 8, is also brought into dead stop, thereby the rotation of the magnetic wheel being also stopped. Therefore, the disc 76 is returned from its acting position to its regular or ineffective position shown in FIG. 8 under the influence of return spring 77, which may be preferably made into a coil spring as shown, but under circumstances replaced by a spiral spring or the like, whereby the actuator arm 94 is receded from contact with microswitch 78 which is therefore brought into its cutoff position. Relay coil 80 is thereby deenergized and armature 79 is returned to its starting position and thus switch arm 202 is transferred from engagement with contact 92 to the contacting position with 91. This position corresponds to that shown with full line in FIG. 1. Therefore, current will flow from the battery 10 through 100, 200, 201, 202, 91, 18a, 204 (dotted line) and earth back to 10. By the energization of lock releasing coil element 18a, the elevated plunger 114 is lowered to its original position, thus the switch arms 12 and 20 of gang switch assembly 11, 204 being transferred from their dotted line position to full line position shown in FIG. 1. In this way, the locked condition of the door lock for driver's door A shown in FIG. 9 is changed back into the unlocked position shown in FIG. 3.

Current flows now from the battery 10 through 100, 101, 12 (full line), 13, 104, 103, 18b, 121', 20b, 23b (dotted line) and earth and back to 10, so that the coil element 18b is energized.

In the similar way, current will flow from 104 through 107, 109, 18c, 126, 22c, 23c (dotted line) and earth and back to 10, so that the coil element 18c is energized.

Current will also flow from 108 through 110, 18d, 22d, 23d (dotted line) and earth and back to 10, so that the coil element 18d is energized.

By the energization of lock releasing coil element 18b, the elevated plunger 123 is lowered to its original position, and the door lock for the assistant's door B is changed from its lock position to unlock position. This operation is similarly performed with the respective door locks for passenger's doors C and D.

By the lowering operation of the respective plungers 123, 128 and 130, switch arms 23b, 23c and 23d of respective switches 20b, 20c and 20d are transferred from their dotted position to their full line position in FIG. 1.

The automatic switch assembly shown in FIG. 8 may be modified into the arrangement shown in FIG. 11.

Figure 11A:
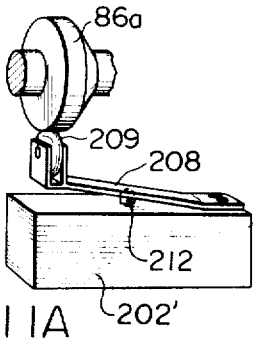
FIG. 11A is a more detailed perspective view of a microswitch shown in FIG. 11.

In this modified arrangement, the automatic switch is arranged and modified as at 202' so as to be controlled by the conventional shift lever. When the automotive vehicle is started, the driver manipulates as commonly known the shift lever 84 so as to displace it from its neutral position to the low or first speed position shown at "1" in FIG. 11, whereby the shift lever shaft 85 is moved slidably upward a certain small distance equal to a half the cam-to-cam distance defined by two cam elements 86a and 86b consisting the cam assembly at 86 which is fixedly attached to the shaft. Thus, the lower cam element 86a is brought into its effective position for controlling the automatic switch 202', as schematically in FIG. 11. The switch 202' is provided with an elastic strip 208 which is fixedly attached at its one end to the switch and carries in turn a follower roller 209 at its another end. With the shift lever 84 positioned in the aforementioned neutral position, the roller 209 is placed between the valley defined between the both cam elements, but it slides up the tapered surface at 210 formed on the lower cam element 86a as will be clearly supposed from a schematic illustration given in FIG. 11B. Another cam element 86b is also formed with a corresponding tapered surface 211 in an opposite relation to said first sloped surface 210. Although in FIG. 11, both cam elements 86a and 86b are shown only in schematic way as if they be true circular discs, they have each in practice a recessed cam surface. When the shift lever is brought into said lowest speed position, the follower roller 209 rises up to one of the highest cam rise as schematically illustrated in FIG. 11C and the elastic strip 208 is therefore urged towards the microswitch 202' so that its control button shown at 212 in FIG. 11A is pushed in, thus the desired transfer corresponding to the shift from contact with 91 to that in engagement with 92 in the automatic switch 202 in FIG. 1 being carried into effect. Thanks to the recessed cam configuration of the lower cam element 86a as shown in FIG. 11C, a manipulation of shift lever 84 to the reverse running stage "R," the same effect will be brought about.

When the shift lever 84 is manipulated to the second speed stage "2" or to the third speed stage "3," the similar effect will be resulted by bringing the upper cam element 86b into its effective position for controlling the microswitch 202'. Although not shown, this second cam element 86b is designed in the similar manner as the first cam element 86c.

By the realization of the aforementioned transfer of said switch 202', a contact corresponding 92 in FIG. 1 will become conductive and the locking coil element 19a is energized. Further operation may be well understood from the foregoing without further analysis. It has been assumed that the driver will depress the conventional engined accelerator pedal, not shown, substantially at the same time with the manipulation of shift lever 84 to the lowest speed stage "1."

When the vehicle is to be stopped, the driver should necessarily return the shift lever 84 to its neutral position. Therefore, the reverse transfer of switch 202' will naturally be brought about. Therefore, the plunger 114 is lowered and the gang switch assembly 11 and 204 will occupy its full-line position and thus all the door locks are electromagnetically released to their lock-releasing position.

The switch 201 shown in FIG. 1 is provided for continuing the locked conditions when necessary even after stoppage of the vehicle running. This provision is highly advantageous in night driving or the like cases for assuring safety against holdups and the like.

When the switch 201 is manipulated for this purpose from its full line position to its dotted line position in FIG. 1, current will flow from the battery 10 through 100, 200, 201 (dotted line), 19a, 20 (full line) and earth and back to 10. By the energization of locking coil element 19a, plunger 114 will elevate in its position and switch arms 12 and 20 are transferred from their full line position to dotted line position as before. In this case, the automatic switch 202 is isolated from the current passage and therefore does not influence upon the functions of all the door locks.

When it is desired under these operating conditions to release the locked conditions of the door locks for every vehicle doors, the switch 20, is manipulated reversely from its dotted line position to its full line position, unlocking coil element 18a is energized so far as the vehicle is kept in its stopped conditions and switch arms 12 and 20 are transferred from their dotted line position to their full line position upon lowering movement of plunger 114.

The purpose of provision of the engine key switch 200 is such that the automatic unlock control circuit including the automatic switch 202 (or the like) and the unlock coil element 18a is thereby isolated from the circuit arrangement shown in FIG. 1, thus providing a chance for performing a practically simultaneous locking or unlocking operation for all the door locks, as desired by the driver. For this purpose, the driver pulls out the engine ignition key from the conventional key cylinder, not shown, on the instrument panel, inserts it into the cylinder 45 shown in FIG. 3 and turns the key in one or another direction for performing a locking or unlocking operation for the driver's door lock, in the manner as was referred to. By this operation, current will be conveyed from the battery to respective locking coil elements 19b, 19c and 19d, or alternatively to respective unlocking coil elements 18b, 18c and 18d. It is clear from the foregoing that the mechanical manipulation of the driver's plunger 114 will produce a corresponding instruction signal to the remaining solenoid assemblies 17b, 17c and 17d, for performing the desired operation thereof in said either case.

In the modification shown in FIG. 12, the practically simultaneous locking operation for all the door locks is performed upon start of the vehicle in the same manner as described hereinbefore, but the practically simultaneous unlocking operation upon stoppage of the vehicle can not be performed and thus the locking conditions of all the door locks will be maintained.

More specifically referring to FIG. 12 in combination with FIG. 13, battery 10, ignition key switch 200 and automatic switch 202″ are connected only to the locking coil element 19a so far as the driver's door solenoid assembly 17a is concerned. The automatic switch 202″ is shown as a representative in FIG. 13. But, it may be replaced, when necessary, b that 202, 202′ or any similar one having similar characteristics shown and described hereinbefore.

When the vehicle is to be started, the driver must manipulate the shift bar 84 so as to occupy the first speed stage "1" as before and then the bar is transferred to the second speed stage "2" and even to the third speed stage "3". In the arrangement shown in FIG. 13, cam element 86′ is also fixedly mounted on the shift bar shaft 85. The configuration of the sole cam 86′ is so selected that only when the shift lever is manipulated to its highest or third speed stage "3", the highest rise of said cam is brought into engagement with the springly switching arm 202a″ which is thus depressed so as to bring the switch at 202″, FIG. 12, in its closed position.

Thus, current will flow battery 10 through 100, 200, 202″, 19a, 204 (full line) and earth and back to 10. In this way, the locking coil element 19a is energized and thus all the door locks including the driver's door lock are brought into their locked position as before. It should be noted in this case that once all the door locks have been locked in the aforementioned way, they can not be brought into their unlocked position even if the shift lever has been manipulated to certain other intermediate speed change stage such as "2" or "1", because even if the closed switch 202″ is reopened thereby, it can not influence the unlocking circuit since there is no provision of electrical connection means between the battery 10 and the unlocking coil element 17a. Therefore, in this case, no unlocking electrical instructions will be delivered from the unlocking coil element 18a.

The preferable modification is shown in FIG. 12 where the automatic switch 202″ is actuated to close when the shift lever 84 has been manipulated to its top speed change stage "3." When the automatic door locking is performed at a slower speed change stage such as at "1," a slightest movement of the vehicle will invite the automatic locking and therefore frequent unlocking operations must be carried about so as to meet practical demands.

When an unlocking operation for all the door locks is desired, the driver draws upward the inside locking button such as at 66 in FIG. 7 for the driver's door A and thus the related plunger is depressed mechanically as before for performing the unlocking of the related door lock. Then, the remaining door locks for doors B, C and D are naturally brought into their unlocked position, as was referred to in connection with FIG. 1.

In FIG. 14, an automatic switch 202″ which is similar to that denoted 202, 202′ or 202″ is provided in the neighborhood of the conventional engine accelerator pedal 87, although its mounting means have been ommitted from the drawing for simplicity, in such a way that its springy switch arm is kept in constant contact with the accelerator pedal. It will be seen from the drawing that whenever the pedal is actuated in the accelerating direction, the switch arm 202a‴ is transferred from its full line position to its dotted line position in FIG. 15. Thus, when the vehicle starts, current will flow from battery 10 through 100, 200 (closed), 202‴, 105 and 111, to respective locking coil elements 19a, 19b, 19c and 19d, and all the door locks are brought into their locked position. Upon this overall locking operation, the related switches 204, 20b, 20c, and 20d are transferred from their full line position to dotted line position.

When it is desired to stop the vehicle, the driver releases his foot pressure from the pedal 87, and the switch 202‴ is brought from its dotted line position back into its full line position and therefore current will flow from battery 10 through 100, 200 (closed), 202‴, 104 and 108, to all the unlocking coil elements 18a, 18b, 18c and 18d in FIG. 15, thus all door locks being brought into their unlocked position. Upon this overall unlocking operation, the respective switches 204, 20b, 20c and 20d are transferred from their dotted line position to full line position, as in the similar way set forth hereinbefore by reference to FIG. 1.

When it is desired to lock the respective door locks from outside of the cab, the ignition key, not shown, is drawn out from its key cylinder as before and then the respective door locks become manually and separately lockable. This locking or unlocking operation from outside can be brought into effect purely mechanically without any reliance of electromechanical locking and unlocking arrangement so far shown and described.

Preferred embodiments of this invention have been described in the foregoing specification and illustrated in the drawings, but it is specifically contemplated that modifications thereof and additions thereto will be obvious to those skilled in the art and such modifications and additions are specifically contemplated to be a part of this invention, the scope of which is limited only as defined in the appended claims.

I claim:

1. A door lock arrangement for use on a vehicle having a plurality of doors, each having manual control means for locking and unlocking said doors, comprising a solenoid coil assembly mounted in each door and having a coil locking portion and a common reciprocal armature means operably connected to said manual control means, electrical circuit means connecting said coil assemblies including power means, first switch means operable upon movement of a selected manual control means to the locking position to complete an energizing circuit to the locking coil portion of each of the coil assemblies assciated with the remaining manual control means to shift said remaining manual control means to the locking positions thereof and second switch means operable by the movement of said remaining manual control means to the locking position to open said energizing circuit.

2. A door lock arrangement as set forth in claim 1 further comprising additional circuit means for automatically energizing the locking coil portion of each of said coil assemblies responsive to a vehicle condition including ignition switch means and vehicle condtion responsive switch means arranged in series with said power means, said vehicle condition responsive switch means having first contact means arranged to complete a circuit through the coil locking portion of the coil assembly associated with said selected one of said manual control means and second contact means arranged to energize the coil unlocking portion of said coil assembly.

3. A door lock arrangement as set forth in claim 2 wherein said vehicle condition responsive switch means is comprised of drive means adapted to be rotated upon movement of the vehicle, magnetic means connected to said drive means for rotary movement, and magnetizable means adapted to be moved on rotation of said magnetic means to shift said vehicle condition responsive switch means into engagement with said first contact means and spring means adapted to shift said vehicle condition responsive switch means into contact with said second contact means upon cessation of rotation of said magnetic means.

*4. A door lock arrangement for use on a vehicle having a plurality of doors comprising a solenoid coil assembly mounted in association with each door and having a coil locking portion, a coil unlocking portion and a common reciprocal armature means, electrical circuit means connecting said coil assembly including power means, first switch means positioned within said electrical circuit means, control means for actuating said first switch means, said first switch means is adapted to energize each of said solenoid coil assemblies to said each door into a locking position or an unlocking position, and second switch means adapted to deenergize one of said locking and unlocking portions in association with the movement of said armature means upon energizing of said one of said locking and unlocking portions, and as far as said first switch means controls so as to energize said one of said locking and unlocking portions, said second switch means being adapted to reestablish the energization of said one of said locking and unlocking portions when said armature means is placed in a position in which said armature means is associated with the other of said locking and unlocking portions.*

*5. A door lock arrangement as set forth in claim 4 wherein said control means is mounted on a dashboard of the vehicle and is manually operated.*

*6. A door lock arrangement as set forth in claim 4 further comprising additional circuit means for automatically energizing the coil locking portion of each of said coil assemblies responsive to a vehicle condition.*

*7. A door lock arrangement as set forth in claim 6 wherein said control means is arranged on a shift lever for a transmission to thereby energize said additional circuit means.*

*8. A door lock arrangement as set forth in claim 6 wherein said control means is arranged on an engine accelerator pedal to thereby energize said additional circuit means.*

*9. A door lock arrangement as set forth in claim 6 further comprising a change-off switch for selective connection of said power source to said additional circuit means and said coil locking portion.*

*10. A door lock arrangement as set forth in claim 6 further comprising an automatic switch means having a simple on-off switch, said automatic switch means being electrically connected to a selective one of said coil locking portions responding to the vehicle condition, and said first switch means being electrically connected to the solenoid coil assembly having said selective coil locking portion.*

*11. A door lock arrangement as set forth in claim 1 wherein said first switch means is operable simultaneously upon movement of a selective manual control means.*

*12. A door lock arrangement as set forth in claim 1 wherein said manual control means is a key arranged to be operative from outside of the vehicle door.*

*13. A door lock arrangement as set forth in claim 1 wherein said manual control means is an inside lock button arranged to be operative from inside of the vehicle door.*

References Cited

The following references, cited by the Examiner, are of record in the patented file of this patent or the original patent.

UNITED STATES PATENTS

| | | | |
|---|---|---|---|
| 2,031,344 | 2/1936 | Thomasma | 180—113 |
| 2,314,815 | 3/1943 | Brandt | 180—113 |
| 3,000,204 | 9/1961 | DeVito | 70—264 |
| 3,030,794 | 4/1962 | Dyer et al. | 70—264 |
| 3,070,183 | 12/1962 | Horton | 180—113 |
| 3,466,905 | 9/1969 | Deibel et al. | 70—264 |

ALBERT G. CRAIG, Jr., Primary Examiner

U.S. Cl. X.R.

70—264